C. E. L. LIPMAN.
STARTER FOR MOTOR CARS.
APPLICATION FILED JULY 5, 1912.
1,127,036.
Patented Feb. 2, 1915.
2 SHEETS—SHEET 2.
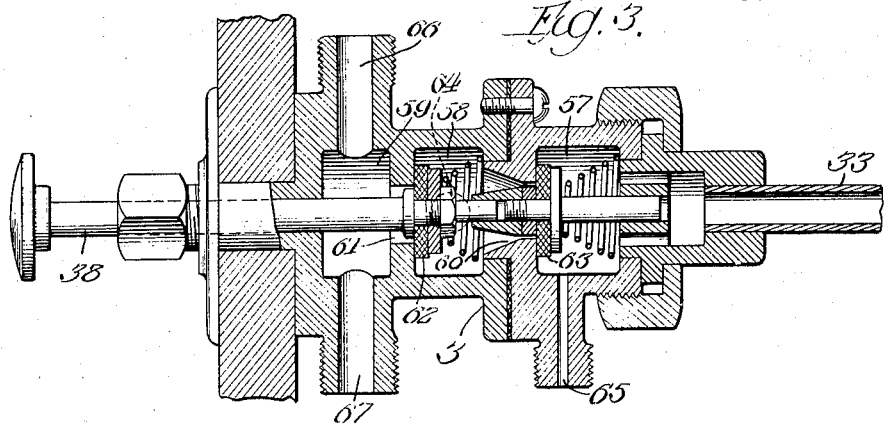
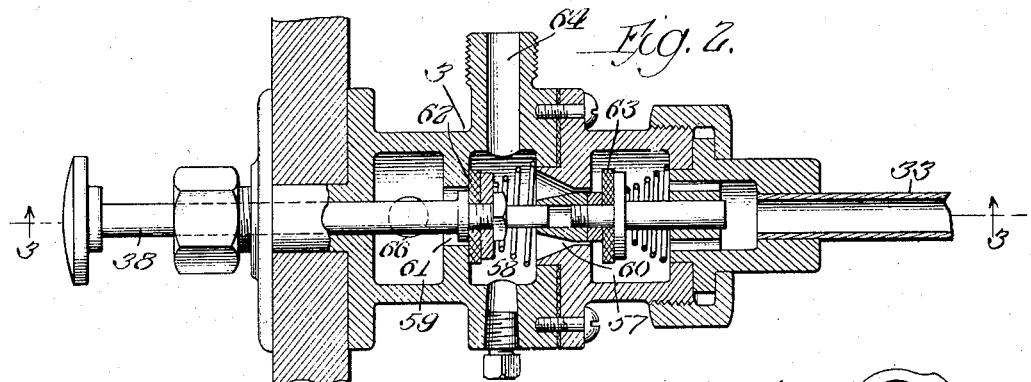
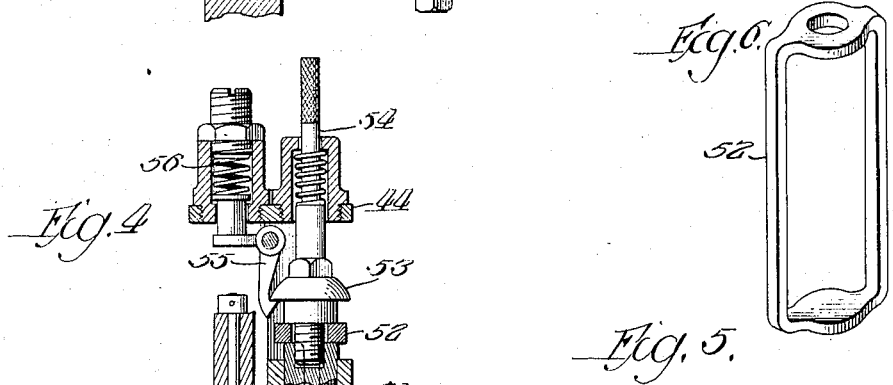
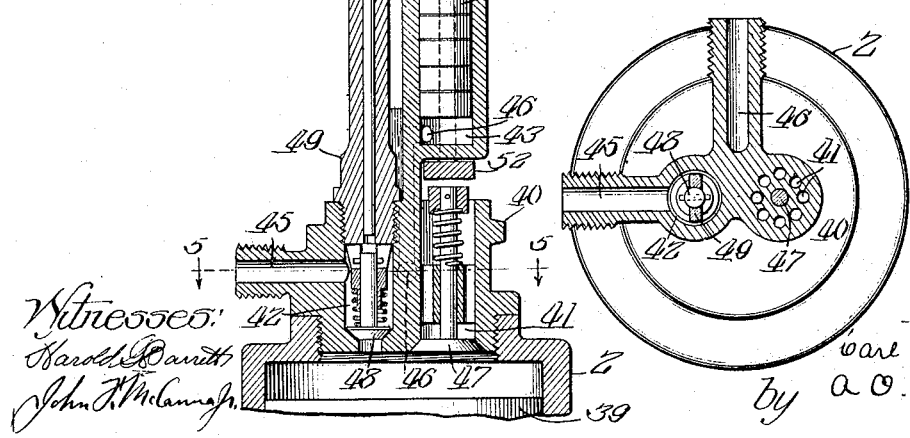
Witnesses:
Harold Barritt
John F. McCanna Jr.
Inventor
Carl E. L. Lipman
by A. O. Behel
Atty.

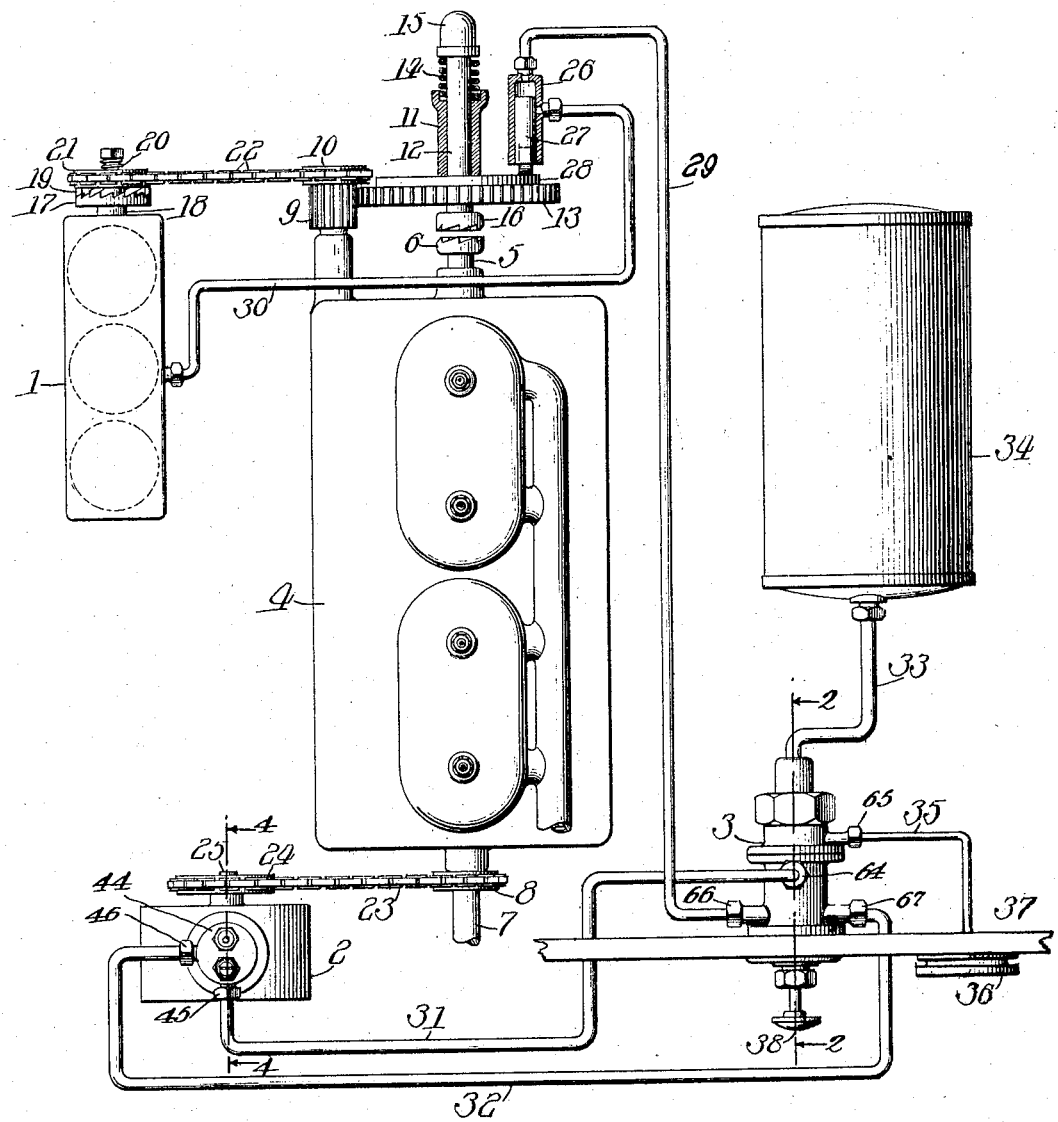

UNITED STATES PATENT OFFICE.

CARL E. L. LIPMAN, OF BELOIT, WISCONSIN, ASSIGNOR TO LIPMAN AIR APPLIANCE COMPANY, OF BELOIT, WISCONSIN, A CORPORATION OF WISCONSIN.

STARTER FOR MOTOR-CARS.

1,127,036.  Specification of Letters Patent.  Patented Feb. 2, 1915.

Application filed July 5, 1912. Serial No. 707,899.

*To all whom it may concern:*

Be it known that I, CARL E. L. LIPMAN, a citizen of the United States, residing at Beloit, in the county of Rock and the State of Wisconsin, have invented certain new and useful Improvements in Starters for Motor-Cars, of which the following is a specification.

The object of this invention is to construct a starter for automobiles which can be operated from the dash of the car.

In the accompanying drawings Figure 1 shows the arrangement of the various instrumentalities employed in the makeup of my improved starter. Fig. 2, is a section taken on the line 2—2 of the distributer valve of Fig. 1. Fig. 3 is a section taken on the line 3—3 of Fig. 2. Fig. 4, is a vertical section taken through the air pump head on the line 4—4 of Fig. 1. Fig. 5, is a plan section taken on the section line 5—5 of Fig. 4. Fig. 6, is a detail view in perspective of the yoke for actuating the inlet valve in said air pump.

The details of construction of the air motor 1, air pump 2 and air distributing valve 3 form the subject matter of copending applications being respectively, Serial Nos. 707,898, 707,900 and 707,901, all filed July 5, 1912.

The explosive engine 4 is of the ordinary make and is provided with a crank-shaft having a forward extension 5 supporting a half clutch section 6, and has a rearward extension 7 supporting a sprocket wheel 8. A spur pinion 9 is supported by the engine frame and has a sprocket wheel 10 rotatable with it. A bearing 11 extends from the engine frame and supports a slidable rod 12 to which is secured a spur gear 13. A spring 14 is interposed between the bearing 11 and the capped end 15 of the rod 12. To the rod 12 is secured a clutch section 16 and which is movable with the spur gear 13, into and out of engagement with the clutch section 6 connected to the engine shaft 5. The spur gear 13 remains in mesh with the spur pinion 9 during the movements of the clutch section 16.

A clutch section 17 is secured to the crankshaft 18 of the air motor 1, and a clutch section 19 is loosely mounted on the crankshaft 18 and held in engagement with the clutch section 17 by the spring 20. A sprocket wheel 21 is movable with the clutch section 19 and is connected with the sprocket wheel 10 by the chain 22.

The air pump 2 is operated by a chain 23 connecting the sprocket wheel 8 with a sprocket wheel 24 secured to the shaft 25 of the air pump 2.

A cylinder 26 is supported in any suitable manner and is provided with a piston 27 which rests in contact with a disk 28, formed a part of the spur gear 13.

The cylinder 26 is connected by the pipe 29 with the distributing valve 3, and a pipe 30 connects the cylinder 26 with the air motor 1. The connection of the pipe 30 with the cylinder is in the side thereof.

The valve mechanism of the air pump 2 is shown in detail in Fig. 4, the piston 39 of the pump being operated through the above mentioned chain drive 23. A valve body 40, is screwed into the head of pump 2 and has vertical intake and exhaust passages 41 and 42 respectively therethrough. The valve body 40 is formed with a cylinder 43, a top 44, a passage 45 communicating with exhaust passage 42 and with the distributing valve 3 by pipe 31, and a passage 46 communicating with the cylinder 43 and the distributing valve by the pipe 32. An intake valve 47 is located in passage 41 and held yieldingly seated. An exhaust valve 48 is disposed in passage 42 and is slidably guided in the plunger carrier 49 which is screwed with the valve head in passage 42 and carries a plunger 50 slidable vertically therein. A piston 51 is reciprocable in the cylinder 43, has a yoked member 52 movable therewith disposed in operable relation with the stem of valve 47 to actuate same, and has an enlarged head 53 with an extension 54 extending through the head 44, the extension being yieldingly depressed. A catch 55 is pivoted to the valve body and adapted to engage the head 53 of the plunger, the catch being held yieldingly in engagement with said head by the adjustable spring 56 in the head 44.

The distributing valve 3 is divided into three compartments 57, 58 and 59, there being a pipe 33 leading from the air supply tank 34 to compartment 57, a port 60 communicating with compartments 57 and 58, and a port 61 between compartments 58 and 59. The plunger 38 carries a valve 62 in compartment 58, the valve being held yieldingly seated on port 61 by a spring. A by-pass valve 63 is disposed in compartment 57 and is held yieldingly seated upon port 60, free to be unseated by back pressure and adapted to be positively unseated by the plunger 38.

The compartment 58 has an outlet passage 64 which connects with pipe 31, and an outlet 65 connecting with a pipe 35 leads to a pressure indicator 36 which is adapted to be located on the dash 37 of the motor car. A passage 66 from compartment 59 communicates with pipe 29 and a passage 67 from said compartment communicates with pipe 32.

With a pressure of air in tank 34, to start the motor 4, the plunger 38 on the dash is pushed in, thus unseating both valves 62 and 63 and allowing air under pressure to pass through 66 and pipe 29 to the cylinder 26. Here the air will actuate the piston 27 which will move the spur wheel 13 to engage the clutch sections 16 and 5. This movement of piston 27 will uncover the opening of pipe 30 and allow the air under pressure to pass to the air motor 1 and operate same, thus rotating the engine crankshaft by the chain drive 22 and gear drive. When the plunger 38 is initially pushed in and air passes to the air motor to start the engine, air also passes through outlet 67 and through pipe 32 to the passage 46 in the valve head 40 and thus to the cylinder 43. In the inoperative position of the valve mechanism in the valve body, the catch 55 will be disengaged from the head 53, thus the piston 51 will be held by the spring on its extension 54, in a lowered position from that shown, with the lower end of the yoke 52 in contact with the end of the intake valve stem, holding said valve unseated and inoperative. Thus when air is admitted to cylinder 43 the piston 51 will be raised, the catch 55 will engage the head 53 and hold the piston in its raised position, whereby the yoke 52 will free the valve 47 and allow same to be moved to an operative position. When the engine has commenced running, by being started as above described, the piston 39 of pump 2 will be reciprocated and thus air will be drawn in through valve 47 and forced out through exhaust valve 48 and through pipe 31 to compartment 58 of the distributer valve since the engine has been started and the valve mechanism of pump 2 actuated, the plunger 38 may be released thus closing the ports 60 and 61, cutting off the air pressure to piston 27 and allowing the spring 14 to disengage the clutch sections 5 and 16. But the air pressure in tank 34 has been reduced through these operations and to replenish it, the air being compressed by pump 2 and forced to compartment 58, as above described, will pass through by-pass 63 and refill said tank. When the air in said tank has reached a predetermined pressure, such pressure of air also existing in exhaust passage 42, it will raise the plunger 50 and release catch 55 against the action of spring 56, from piston 51 and allow said piston to be actuated by its spring and move the inlet valve 41 to an open inoperative position, thus stopping the supply of air to said tank.

It will be seen that after the engine has been started by air pressure and the plunger 38 released, that the feed of compressed air to the supply tank is entirely automatic and that when the pressure in said tank reaches a predetermined point, said feed is automatically shut off, also that the pump 2 would upon being rendered operative, supply air continuously until said predetermined pressure is reached.

I claim as my invention:

1. In a self starting system, the combination of an engine shaft, air actuated means for rotating said shaft, an air supply, a distributing valve having a connection with said air supply and air actuated means, an air pump having a connection with said distributing valve and adapted to supply air to said air supply, and a control for said distributing valve, the operation of said control allowing air to pass from said air supply to said air actuated means and to said air pump.

2. In a self starting system, the combination with a driven member and an air actuated drive means, of an air supply, a distributing valve communicating with the air supply and air actuated drive means, an air pump communicating with said air supply and distributing valve, and a control for said valve, the operation of which communicates said air supply with said air actuated drive means to operate said driven member and with said air pump to render the pump operative to furnish air to said air supply.

3. The combination of an engine-shaft, an air-motor, a connection between the engine-shaft and air-motor including a clutch, an air-valve having connection with the air-motor and adapted to actuate said clutch, an air-tank, an air-pump driven by the engine-shaft for supplying air to said tank, and a distributing valve having a connection with the tank, air-valve and air-pump, the actuation of the distributing valve causing air to be delivered from the tank to the air-valve, thereby actuating said clutch and operating the air-motor, also simultaneously causing said air-pump to furnish air to the tank.

4. A starting device, comprising an air actuatable member, an air supply, a distributing valve communicating with the air supply and air actuatable member, an air pump, air actuatable valve mechanism for the pump having a communication with the distributing valve and air supply, and a control for the distributing valve, the operation of which will communicate the air supply with the air actuatable member and the air supply with said air actuatable valve mechanism and render the valve mechanism operative.

5. In a starting device, an air actuatable driving means, an air supply, a distributing valve and an air pump having air actuatable valve mechanism, the air pump adapted to furnish air to said air supply, and the distributing valve adapted, when operated to start, to control a passage of air from said supply to said air actuatable means and to control a passage of air from said supply to said air pump to render the pump operative.

6. A starting device comprising an air actuatable member, an air supply, a distributing valve, having a communication with said air supply and air actuatable member, an air pump for furnishing air to said supply, in combination with an air actuatable valve mechanism for the pump having a communication with said distributing valve, the actuation of said valve mechanism by air from said distributing valve rendering said valve mechanism operative until a predetermined pressure of air has been compressed by said pump for said air supply, and means for operating said distributing valve whereby air will be passed from the supply to said air actuatable member and to said valve mechanism.

7. In a starting system, the combination of an air actuatable member, an air supply, an air pump, a distributing valve having an air communication leading to said air actuatable member, air supply, and air pump, and a control for said valve, the operation of which simultaneously allows air to pass from said supply to said air actuatable member and air pump.

8. In a starting system, the combination of an air actuatable member, an air supply, an air pump, a distributing valve having an air communication leading to said supply, air actuatable member and air pump, a discharge passage from said pump leading to said distributing valve, and a control for said valve, the movement of which to an operative position will communicate said air supply with the air actuatable member and air pump, the control when in its inoperative position allowing air to pass from said pump discharge to the distributing valve and to the air supply.

9. In a self starting system, the combination with a driven member and an air actuated drive means, of an air supply, a distributing valve communicating with the air supply and drive means, an air pump, air actuatable valve mechanism therefor having communication with said distributing valve, and a control for the distributing valve, the actuation of which simultaneously allows air to pass from said air supply to said air actuatable drive means and to said air actuatable valve mechanism.

10. In a starting system, the combination of an engine, air actuated means for starting the same, an air pump adapted to be driven by the running of the engine, air actuatable valve mechanism for the pump, said valve mechanism being normally inoperative during the said driving of the pump, and an air supply communicating with both the intake and discharge of the pump valve mechanism and with the starting means, whereby air from said supply may actuate said valve mechanism and starting means and render the same operative, whereupon the said driving of the pump will cause air to be compressed and said air supply replenished.

In testimony whereof I have hereunto set my hand in presence of two subscribing witnesses.

CARL E. L. LIPMAN.

Witnesses:
A. O. BEHEL,
JOHN McCUNE, Jr.